Figure 2:
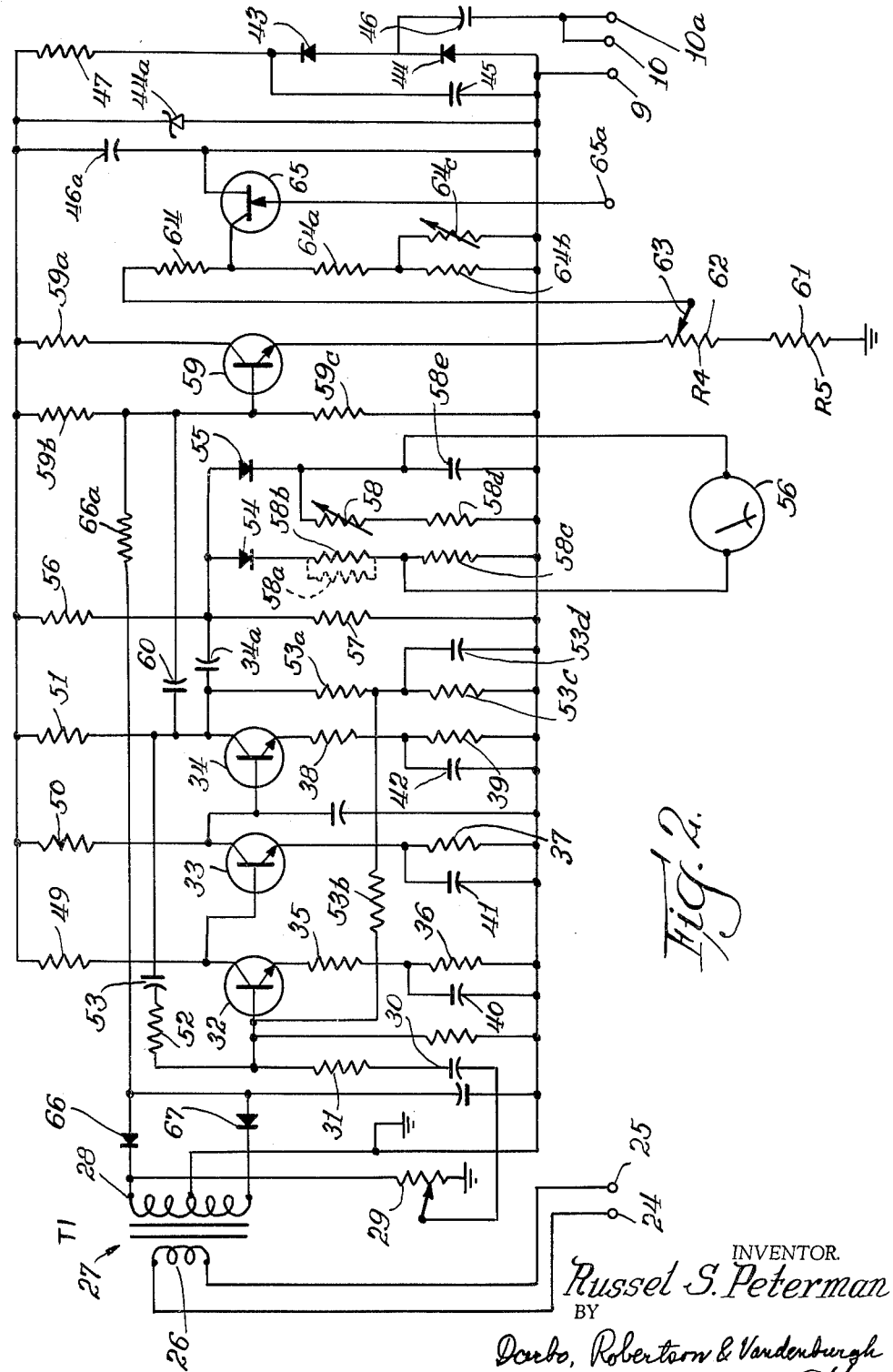

March 8, 1966  R. S. PETERMAN  3,239,828
COMBUSTIBLE GAS DETECTOR
Filed July 27, 1962  2 Sheets-Sheet 1
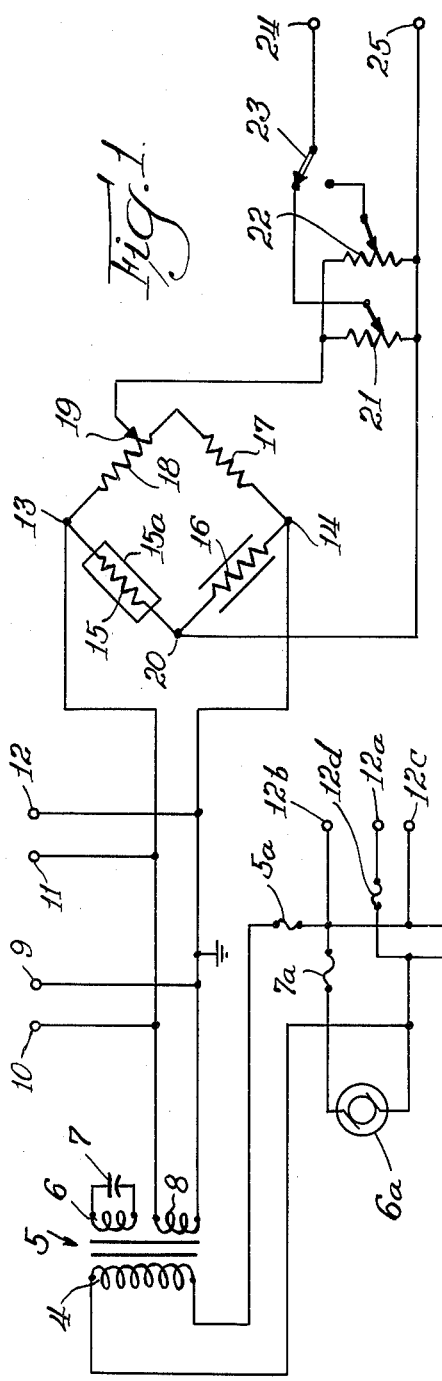
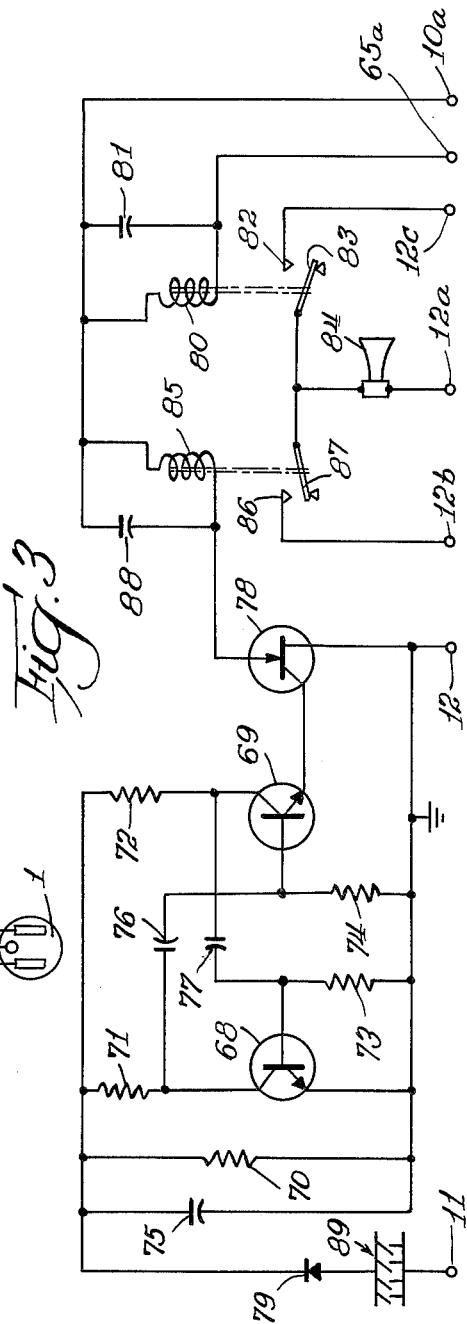
INVENTOR.
Russel S. Peterman
BY
Darbo, Robertson & Vandenburgh
Att'ys.

INVENTOR.
Russel S. Peterman
BY
Darbo, Robertson & Vandenburgh
Attys.

United States Patent Office 3,239,828
Patented Mar. 8, 1966

3,239,828
COMBUSTIBLE GAS DETECTOR
Russel S. Peterman, Des Plaines, Ill., assignor to Erdco Engineering Corporation, Addison, Ill., a corporation of Delaware
Filed July 27, 1962, Ser. No. 212,841
2 Claims. (Cl. 340—237)

This invention relates to the detection of particular gases in a mixture, and more particularly refers to an apparatus for the detection of combustible gases which may be present in the atmosphere.

There are many industrial and military applications which utilize combustible materials either in gaseous form or in volatile liquid form. These materials are capable of causing explosive mixtures of gases or vapors if permitted to accumulate in the atmosphere, thereby creating a serious hazard to life and property. Many of the combustible gases and vapors are also toxic, and may even be toxic at much lower concentrations than the concentrations at which they are explosive. It is therefore extremely important to detect the presence of such gases or vapors in the atmosphere before the concentration reaches the danger point.

It is an object of the invention to provide an apparatus which is capable of detecting combustible gases present in the atmosphere in extremely low concentration.

It is a further object to provide an apparatus sufficiently sensitive to detect the presence of highly toxic combustible gases and vapors and determine their concentration even at such low values as their toxic levels.

It is a further object to provide such an apparatus which is capable of giving a characteristic audible alarm when the concentration of combustible gases has reached the value at which it constitutes either an explosive or a toxic hazard.

It is a further object to provide an apparatus of the type described which sounds an audible alarm to indicate a fault in the apparatus, which alarm is distinguishable from the audible alarm indicating a dangerous gas concentration..

It is still further an object to provide such an apparatus in which means are provided to prevent a fault in the apparatus from setting off the alarm used to indicate a high gas concentration.

Other objects and advantages of the invention will become apparent form the following description when taken in conjunction with the drawings in which:

FIG. 1 is a schematic circuit diagram of the power supply and gas detection apparatus.

FIG. 2 is a schematic circuit diagram of the amplifier used to amplify the signal produced by the detecting apparatus, and to discriminate between signals resulting from faults in the apparatus and signals caused by high combustible gas concentrations; and FIG. 3 is a schematic diagram of the circuit used to provide a distinctive signal indicating apparatus faults, together with associated relays for actuating both the gas alarm and the apparatus fault alarm.

According to the invention, the atmosphere is sampled and caused to pass over a heated catalytic platinum wire forming one arm of a Wheatstone bridge by means of a vacuum pump. Combustible gases passing over the heated platinum wire are oxidized, further raising the temperature of the platinum wire. The increase in temperature causes an increase in the resistance of the platinum wire, unbalancing the bridge and producing an unbalance alternating current signal. This signal is amplified and continuously metered to indicate current gas concentration, and also caused to actuate an alarm when it has reached a predetermined value.

An important feature of the invention resides in the operation of the Wheatstone bridge by means of an alternating current. As a result, the unbalanced current produced by the presence of a combustible gas causes an alternating current signal to be produced. An alternating current signal is much easier to amplify than a direct current signal, and permits a relatively simple and inexpensive alternating current amplifier to be used to render the apparatus extremely sensitive and able to detect even very low concentrations of gases.

The use of an alternating current makes possible a further feature of the invention. In prior art apparatuses in which a bridge is used to detect the existence of a combustible gas, the presence of such a gas causes the bridge to become unbalanced in one direction. A fault in the apparatus such as a failure of the pump or a clogged line may cause an unbalance in the other direction. The devices of the prior art are unable to distinguish between the two directions of unbalance, and therefore a gas alarm sounds both when the presence of a gas is detected and when there is a fault in the apparatus. According to the present invention, an alternating current in phase with the signal current is superimposed thereon. The alarm is adjusted to be actuated when the sum of the two currents in phase reaches a certain value. When the bridge becomes unbalanced in the other direction as by a fault in the apparatus, the signal current is then 180°, out of phase with the superimposed current. As a result, the signal current is subtracted from the superimposed current and the alarm cannot be actuated.

The use of alternating current applied to the bridge offers another advantage. It has been found that the life of the platinum filament is greatly extended when an alternating current is used. This effect is believed to be due to the fact that a direct current causes small particles of platinum to be thrown off from the filament during the period when current is applied. In contrast, the rapid alternations in direction of an alternating current do not offer sufficient time for the particles to be thus thrown off. The effect is believed to be similar to the effects noted in electrolysis in a solution in which a direct current causes a metallic anode to dissolve in the electrolytic solution, while an alternating current has no such effect.

A further feature of the present invention is the provision for preventing the gas alarm from being actuated when one of the platinum filaments burns out. This normally causes a signal current to be produced having the same phase as that produced by an unbalance signal resulting from the presence of combustible gas, and would actuate the gas alarm. In the present apparatus means is provided to prevent an abnormally high signal current from actuating the gas alarm.

Referring to FIG. 1 of the drawings, the power supply is shown connected to a 110 volt A.C. main 1 utilizing a ground connection 2 for safety. An explosion-proof switch 3 controls the current to the apparatus. The main is connected to the primary 4 of a transformer 5, the circuit being protected by a fuse 5a. The main is also connected to a vacuum pump 6a, this circuit being protected by a fuse 7a. The main is also connected to terminals 12a, 12b and 12c of FIG. 3, and protected by a fuse 12d. The transformer 5 has one secondary winding 6 which, together with a capacitance 7, acts to stabilize the output voltage of the transformer. The other secondary winding 8 provides the 6.3 volt A.C. supply for the various portions of the control circuits. The 6.3 volt A.C. current is supplied to the amplifier at terminals 9 and 10. It is supplied to the multivibrator of FIG. 3 by means of terminals 11 and 12. It is also provided at points 13 and 14 of the Wheatstone bridge.

Two of the legs of the bridge circuit are composed of two platinum filaments 15 and 16 connected in series across the 6.3 volt A.C. voltage supply. The filament 16 is exposed to the sample atmosphere being drawn through the apparatus by the vacuum pump 6a. Because platinum is an oxidation catalyst, when heated it causes the combustible gases, which may also be toxic, to become oxidized. The oxidation of the gases further raises the temperature of the exposed filament 16 increasing its resistance and resulting in an unbalance of the bridge.

The filament 15 is shielded from the air by means of a shield 15a composed of a material having a high thermal conductivity and a low thermal capacity. The filament 15 is used solely for temperature compensation. The other two legs of the bridge are comprised of a fixed resistance 17 and a tapped variable resistance 18. The adjustable tap 19 is used to balance the bridge, and is normally adjusted so that it is at the same potential as the point 20 between the two platinum filaments 15 and 16. When the bridge becomes unbalanced, an A.C. signal is developed between the points 19 and 20. In order to provide two adjustable ranges having different sensitivities, variable resistances 21 and 22 are provided, each having a different value dependent upon the range desired. For example, one range may be used to indicate parts per million of the combustible gas detected, while the other range may be used to indicate the percent of explosive value which the combustible gas concentration has attained. Each range is separately adjustable for calibration. A switch 23 permits selection of the desired range. The signal from the bridge is applied between the terminals 24 and 25 which form the input terminals for the amplifier.

Referring to FIG. 2, the signal applied at the terminals 24 and 25 is introduced into the primary 26 of the transformer 27. One side of the secondary 28 is connected through the variable resistor 29, capacitor 30 and resistor 31 to an A.C. amplifier comprised of three transistors, 32, 33 and 34. Each of the transistors may be of the type commercially designated as T1–495. The emitters of each of the transistors are connected to ground by means of associated resistors 35, 36, 37, 38 and 39, and capacitors 40, 41, and 42, the values for which may be readily chosen by those skilled in the art.

Power for the amplifier is provided by means of the 6.3 volt alternating current applied at terminals 9 and 10. The alternating current is rectified, doubled, and filtered by the filter assembly comprised of diodes 43 and 44, and capacitors 45, 46 and 46a. A Zener diode 44a is used as a voltage regulator. After passing through the resistor 47 a voltage of about 10 volts is applied to the input of the transistors. Resistors 49, 50 and 51 drop the voltage applied to the collectors of each transistor to the proper value. Feedback for improving the response of the amplifier is provided by a resistor 52 and a capacitor 53, and by a separate circuit including resistors 53a and 53b. A portion of the amplified signal provided by the transistor 34 through capacitor 34a is rectified by means of diodes 54 and 55 as supplied to the meter 56. The diodes 54, 55 have a threshold voltage below which current does not flow. In order that the meter may be activated by a small A.C. voltage, a fixed bias voltage derived from the resistors 56, 57 is used in order to bring the applied voltage to the threshold value. The diode rectifier 55 is connected to make the meter read up scale. The diode rectifier 54 is connected to make the meter read down scale. As a result, the meter has a response which is expanded at the lower end of the scale and compressed at the upper end of the scale. A temperature sensitive resistor 58 having a negative temperature coefficient of resistance is used to compensate for a variation in temperature. Associated resistors 58a, 58b, 58c and 58d, and capacitor 58e also control the current applied to the meter.

A second portion of the A.C. signal present at the collector of transistor 34 is applied to the base of a transistor 59 through the circuit including the capacitor 60. This transistor is connected in a cathode follower circuit and provides a power gain for the A.C. signal. Current is provided for the collector through a resistor 59a and bias for the base provided by a voltage divider comprised of resistors 59b and 59c, and a variable resistor 62 having a movable arm 63. The movable arm 63 is connected through a resistor 64 to the gate or base of the silicon control rectifier 65. The control rectifier may be of the type commercially designated as 2N1881. The anode of the control rectifier 65 is connected to terminal 65a at which point it enters the primary of the relay 80, shown in FIG. 3, and returns to the 6.3 volt A.C. terminal 10a. The cathode of the control rectifier 65 is returned to ground. The gate of the control rectifier 65 is biased by means of resistors 64a, 64b, and temperature sensitive resistor 64c.

The relay 80 has a by-pass capacitor 81 and contacts 82 and 83. When the relay 80 is activated, the contacts 82, 83 are closed and 110 volt A.C. current is caused to flow through the alarm horn 84, giving a steady audible alarm indicating a dangerous gas concentration.

In order to provide for a continuous alarm until the apparatus is reset by the operator, the relay 80 may be of the type which is self-locking when activated. After the danger has been removed, normal operation of the relay may be restored by manual resetting. Alternatively, the relay 80 may be provided with contacts which are normally closed when the relay is inactivated. The circuit through the closed contacts is connected to a second relay having normally closed contact when inactivated and an open circuit when activated. This provides a fail-safe arrangement. During normal operation, the second relay is actuated through the closed contact of the first inactivated relay. When an alarm sounds, this circuit is broken, causing the contact of the second relay to close and lock giving a continuous signal. The second relay may be restored to normal operation by manual resetting.

As a result of the circuitry described, an adjustable D.C. voltage having an A.C. rider voltage is applied to the gate of the control rectifier 65. A larger A.C. voltage is applied to the anode of the control rectifier 65. According to the present invention, the relationship of the applied voltage to the anode of the control rectifier 65 is so chosen that it is in phase with the signal voltage applied to the gate resulting from a bridge unbalance caused by increased resistance in the platinum filament 16 as a result of increased combustible gas concentration. Consequently when the signal current increases it causes an increase in the anode current of the rectifier 65. However, when the bridge is unbalanced in the other direction, such as by faults in the apparatus, the unbalance signal applied at the gate of the control rectifier 65 is out of phase with the A.C. voltage applied to the anode. Consequently, the control rectifier is not rendered conductive and the signal alarm is not activated.

When the lower explosive limit of the apparatus is reached, approximately 0.018 volt are applied to the primary 26 of the input transformer 27. If a platinum filament should burn out, this voltage may increase to approximately one volt. This increase, since it would be in phase with the voltage applied to the anode of the control rectifier 65, would normally activate the alarm, erroneously indicating a dangerous combustible gas level. Consequently, in order to prevent the situation where an erroneous gas alarm might be sounded by a filament burnout, a special circuit is provided to prevent a burned out filament from actuating a continuous alarm indicating a dangerous gas level. The special circuit is comprised of diodes 66 and 67 connected to the secondary 28 of the transformer 27. During normal operation, when a small voltage of up to about 0.018 volt is applied to the input of the amplifier, the diodes 66 and 67 are non-conducting, and the operation of the transistor 59 is normal. However, when a sudden increase in voltage results from bridge unbalance caused by a burned out filament, this increased voltage causes the diodes 66 and 67 to conduct and to place a negative voltage through the circuit including the resistor 66a on the base of the transistor 59, cutting it off completely and thereby preventing the sounding of the gas alarm.

Indication of a fault in the apparatus is given by means of an intermittent audible signal, as well as various visible signals. Intermittent excitation of the audible alarm is provided by means of a multivibrator circuit, known in the art and shown in FIG. 3, which actuates the relay controlling the alarm horn 84. Alternatively, other means of providing intermittent signals such as magnetic relays may be used.

Referring to FIG. 3, the multivibrator circuit is comprised of a pair of transistors 68 and 69, and associated resistors 70, 71, 72, 73, and 74, and capacitors 75, 76, and 77. The resistor 70, the capacitor 75, and a diode 79 comprise the power supply for the multivibrator and are supplied with A.C. current at connections 11 and 12. The output from the transistor 69 is applied to the gate of a control rectifier 78. The cathode of the control rectifier is connected to ground and the anode is connected to the relay 85 having contacts 86, 87, and being by-passed by capacitor 88. The other side of the relay returns to terminal 10a, and the fault switches placed in series with 6.3 volt A.C. supply designated by the numeral 89 are placed in parallel with each other in series with the 6.3 volt A.C. supply. The individual switches may be connected in various parts of the apparatus to close when faults occur such as low vacuum, high vacuum, filaments burnout, fuse burnout, etc. As soon as any one of the switches is closed, the multivibrator beings to operate and intermittently activates the relay 85, causing an intermittent signal to be produced by the alarm horn 84.

The combustible gas alarm of the present invention has many advantages over those of the prior art. The use of an alternating current to activate the bridge permits the use of simple very high gain amplifiers so that extremely small gas concentrations may be detected. This is particularly significant in applications where highly toxic gas and vapors are used and which must be detected at extremely low concentrations, generally much lower than the explosive level. The use of an A.C. current in the bridge also permits a phase change discriminator to be used to prevent unbalance in the bridge in reverse direction caused by apparatus faults from activating the main gas alarm signal. Further provision is made to prevent a filament burnout from activating the gas alarm. The apparatus has proved to be extremely reliable in use and operates over long periods without attention.

Although the present invention has been described in only one embodiment, variations thereof may be practiced by those skilled in the art without departing from the spirit or scope of the invention as defined in the appended claims.

Invention is claimed as follows:

1. An apparatus for the detection and measurement of concentration of a combustible gas in the atmosphere which comprises a Wheatstone bridge comprised of a pair of similar platinum filaments connected as two adjacent legs thereof and a pair of resistors connected as the other two adjacent legs thereof, one of said resistors being adjustable for balancing said bridge, one of said platinum filaments being completely enclosed from the atmosphere and the other of said filaments being exposed to the atmosphere, means for continuously drawing samples of the atmosphere over said exposed filament, means for applying an alternating current between those ends of said filaments which are not adjacently connected together for heating said filaments and energizing said bridge, amplifier means for amplifying the alternating current signal produced by unbalance of said bridge, means for causing said amplified alternating current signal to actuate a gas alarm when it has reached a predetermined value, and disabling means for preventing an abnormally high signal current produced by bridge unbalance resulting from a burned out filament from actuating said gas alarm which comprises a pair of diodes connected between the input of said amplifier and the control electrode of an electronic amplifying means contained within said amplifier, the conduction threshold of each of said diodes being greater than the unbalance signal voltage resulting from bridge unbalance caused by a high gas concentration and lower than the unbalance signal voltage caused by a burned out filament, whereby said diodes prevent a normal unbalance signal voltage from disabling said amplifier, and whereby an abnormally high signal voltage resulting from a burned out filament causes said diodes to become conductive and to permit a disabling voltage to be applied to the control electrode of said electronic amplifying means, preventing the actuation of said gas alarm.

2. An apparatus for the detection and measurement of concentration of a combustible gas in the atmosphere which comprises a Wheatstone bridge comprised of a pair of similar platinum filaments connected as two adjacent legs thereof and a pair of resistors connected as the other two adjacent legs thereof, one of said resistors being adjustable for balancing said bridge, one of said platinum filaments being completely enclosed from the atmosphere and the other of said filaments being exposed to the atmosphere, means for continuously drawing samples of the atmosphere over said exposed filament, means for applying an alternating current between those ends of said filaments which are not adjacently connected together for heating said filaments and energizing said bridge, amplifier means for amplifying the alternating current signal produced by unbalance of said bridge, a silicon control rectifier having a gate electrode, an anode and a cathode, said gate electrode being connected to the output of said amplifier means, means for applying an alternating current to said anode and said cathode in phase with the signal produced by said amplifier when said bridge is unbalanced in the direction caused by an increase in resistance of said exposed filament, alarm means and means for actuating said alarm means when the current applied to said anode and said cathode reaches a predetermined value, and disabling means for preventing an abnormally high signal current produced by bridge unbalance resulting from a burned out filament from actuating said gas alarm which comprises a pair of diodes connected between the input of said amplifier and the control electrode of an electronic amplifying means contained within said amplifier, the conduction threshold of each of said diodes being greater than the unbalance signal voltage resulting from bridge unbalance caused by a high gas concentration and lower than the unbalance signal voltage caused by a burned out filament, whereby said diodes prevent a normal unbalance signal voltage from disabling said amplifier, and whereby an abnormally high signal voltage resulting from a burned out filament causes said diodes to become conductive and to permit a disabling voltage to be applied to the control electrode of said electronic amplifying means, preventing the actuation of said gas alarm.

References Cited by the Examiner

UNITED STATES PATENTS

| | | |
|---|---|---|
| 899,068 | 9/1908 | Philip et al. |
| 1,940,513 | 12/1933 | Stein. |
| 2,434,822 | 1/1948 | Van Beuren et al. __ 324—89 XR |
| 2,830,265 | 4/1958 | Ellison _____ 324—89 XR |
| 2,998,533 | 8/1961 | Haskell _____ 307—88.5 |
| 3,147,465 | 9/1964 | Brown et al. _____ 340—237 |

NEIL C. READ, *Primary Examiner.*